United States Patent
Ringseth et al.

(10) Patent No.: US 9,367,350 B2
(45) Date of Patent: Jun. 14, 2016

(54) META-SCHEDULER WITH META-CONTEXTS

(75) Inventors: Paul F. Ringseth, Bellevue, WA (US); William R. Messmer, Woodinville, WA (US); Niklas Gustafsson, Bellevue, WA (US); Joseph L. Hellerstein, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1925 days.

(21) Appl. No.: 12/244,966

(22) Filed: Oct. 3, 2008

(65) Prior Publication Data

US 2010/0088704 A1    Apr. 8, 2010

(51) Int. Cl.
*G06F 9/455* (2006.01)
*G06F 9/48* (2006.01)

(52) U.S. Cl.
CPC .......... *G06F 9/4881* (2013.01); *G06F 9/45533* (2013.01)

(58) Field of Classification Search
None
See application file for complete search history.

(56) References Cited

U.S. PATENT DOCUMENTS

| | | | |
|---|---|---|---|
| 5,759,044 A | 6/1998 | Redmond | |
| 7,865,893 B1* | 1/2011 | Omelyanchuk et al. | 718/1 |
| 2002/0046230 A1 | 4/2002 | Dieterich et al. | |
| 2006/0130062 A1* | 6/2006 | Burdick et al. | 718/100 |
| 2007/0106990 A1 | 5/2007 | Kissell | |
| 2008/0155536 A1* | 6/2008 | Levit-Gurevich et al. | 718/1 |
| 2009/0037911 A1* | 2/2009 | Ahuja et al. | 718/100 |
| 2009/0204959 A1* | 8/2009 | Anand et al. | 718/1 |
| 2009/0204962 A1* | 8/2009 | Diaz et al. | 718/1 |
| 2009/0217283 A1* | 8/2009 | Anand et al. | 718/104 |

OTHER PUBLICATIONS

"Thread Management", "The Jikes RVM Project", Retrieved at <<http://jikesrvm.org/Thread+Management>>, Jul. 29, 2008, pp. 3.
Lee, et al., "Simulation Study of Multithreaded Virtual Processor", Retrieved at <<http://citeseer.ist.psu.edu/cache/papers/cs/16346/ftp:zSzzSzftp.ece.orst.eduzSzpubzSzuserszSzbenlzSzEuro_PDS98.pdf/lee98simulation.pdf>>, "IASTED International Conference on Parallel and Distributed Systems (Euro-PDS)", Jul. 1-3, 1998, Vienna, Austria, pp. 6.
Oguma, et al., "A Scheduling Mechanism for Lock-free Operation of a Lightweight Process Library for SMP Computers", Retrieved at <<http://ieeexplore.ieee.org/iel5/7439/20222/00934825.pdf?isnumber=20222&prod=STD&arnumber=934825&amumber=934825&arSt=235&ared=242&arAuthor=Oguma%2C+H.%3B+Nakayama%2C+Y.>>, 2001, p. 235-242.
Oehmke, et al., "Design and Applications of a Virtual Context Architecture", Retrieved at <<https://www.eecs.umich.edu/techreports/cse/2004/CSE-TR-497-04.pdf>>, 2004, pp. 41.
Benson, et al., "The Virtual Processor Interface:Linux Kernel Support for User-level Thread Systems", Retrieved at <<http://www.cs.usfca.edu/~afedosov/vpi.pdf>>, 2003, pp. 7.
Luth, et al., "The EVENTS Approach to Rapid Prototyping for Embedded Control Systems", Retrieved at <<http://ses.informatik.uni-oldenburg.de/publications/peikenkamp97a.ps>>, 1997, pp. 9.

* cited by examiner

*Primary Examiner* — Jacob A Petranek
(74) *Attorney, Agent, or Firm* — Kate Drakos; Kevin Sullivan; Micky Minhas

(57) ABSTRACT

A process in a computer system creates and uses a meta-scheduler with meta-contexts that execute on meta-virtual processors. The meta-scheduler includes a set of schedulers with scheduler-contexts that execute on virtual processors. The meta-scheduler schedules the scheduler-contexts on the meta-contexts and schedules the meta-contexts on the meta-virtual processors which execute on execution contexts associated with hardware threads.

20 Claims, 9 Drawing Sheets

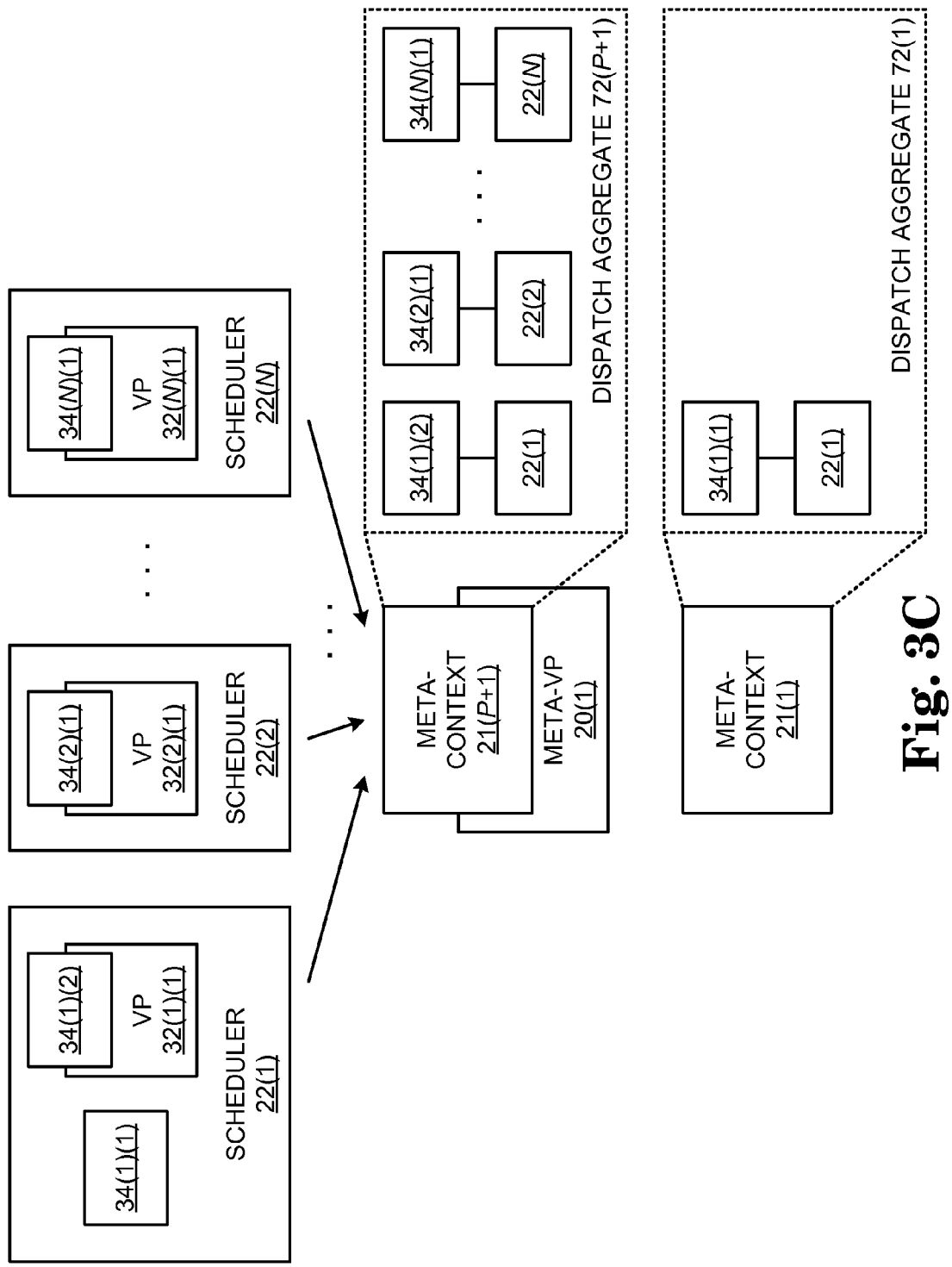

META-SCHEDULER WITH META-CONTEXTS

BACKGROUND

Processes executed in a computer system may include schedulers that schedule tasks of processes for execution in the computer system. A scheduler may access operating system (OS) execution contexts (e.g., threads, fibers, or child processes) in order to execute tasks on processing resources allocated to the scheduler.

A process may create any number of schedulers where each scheduler operates with any number of execution contexts. As the number of schedulers increases, the overall number of execution contexts used by the schedulers may become difficult to manage. In addition, an excess number of overall execution contexts may have an undesirable impact on the execution of the process by the computer system.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A process in a computer system creates and uses a meta-scheduler with meta-contexts that execute on meta-virtual processors. The meta-scheduler includes a set of schedulers with scheduler-contexts that execute on virtual processors. The meta-scheduler schedules the scheduler-contexts on the meta-contexts and schedules the meta-contexts on the meta-virtual processors which execute on execution contexts associated with hardware threads.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIGS. 3A-3D are block diagrams illustrating embodiments of meta-contexts in a meta-scheduler.

DETAILED DESCRIPTION

In the following Detailed Description, reference is made to the accompanying drawings, which form a part hereof, and in which is shown, by way of illustration, specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1A:
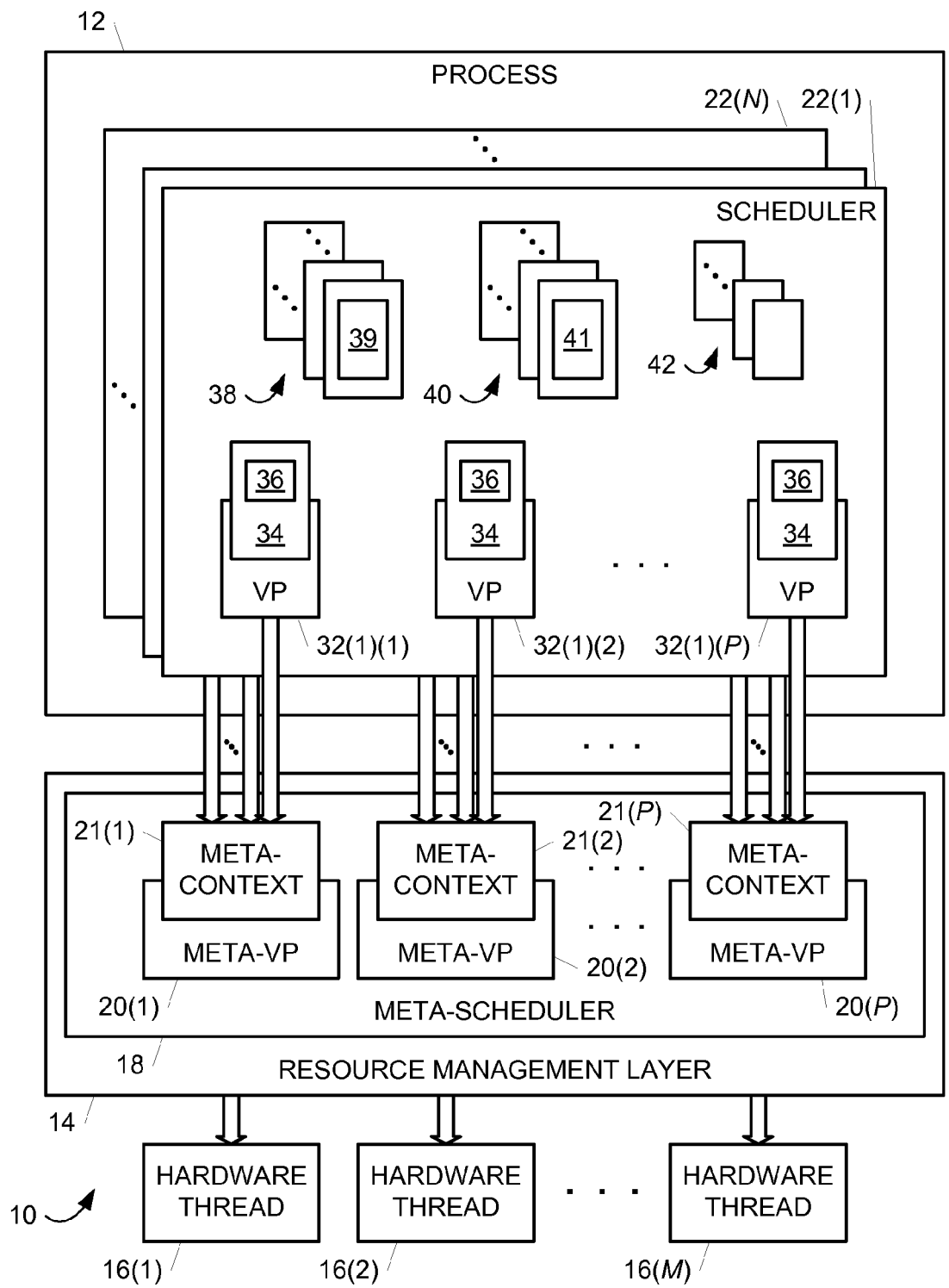
FIGS. 1A-1B are block diagrams illustrating embodiments of a meta-scheduler with meta-virtual processors and meta-contexts in a runtime environment.
Figure 1B:
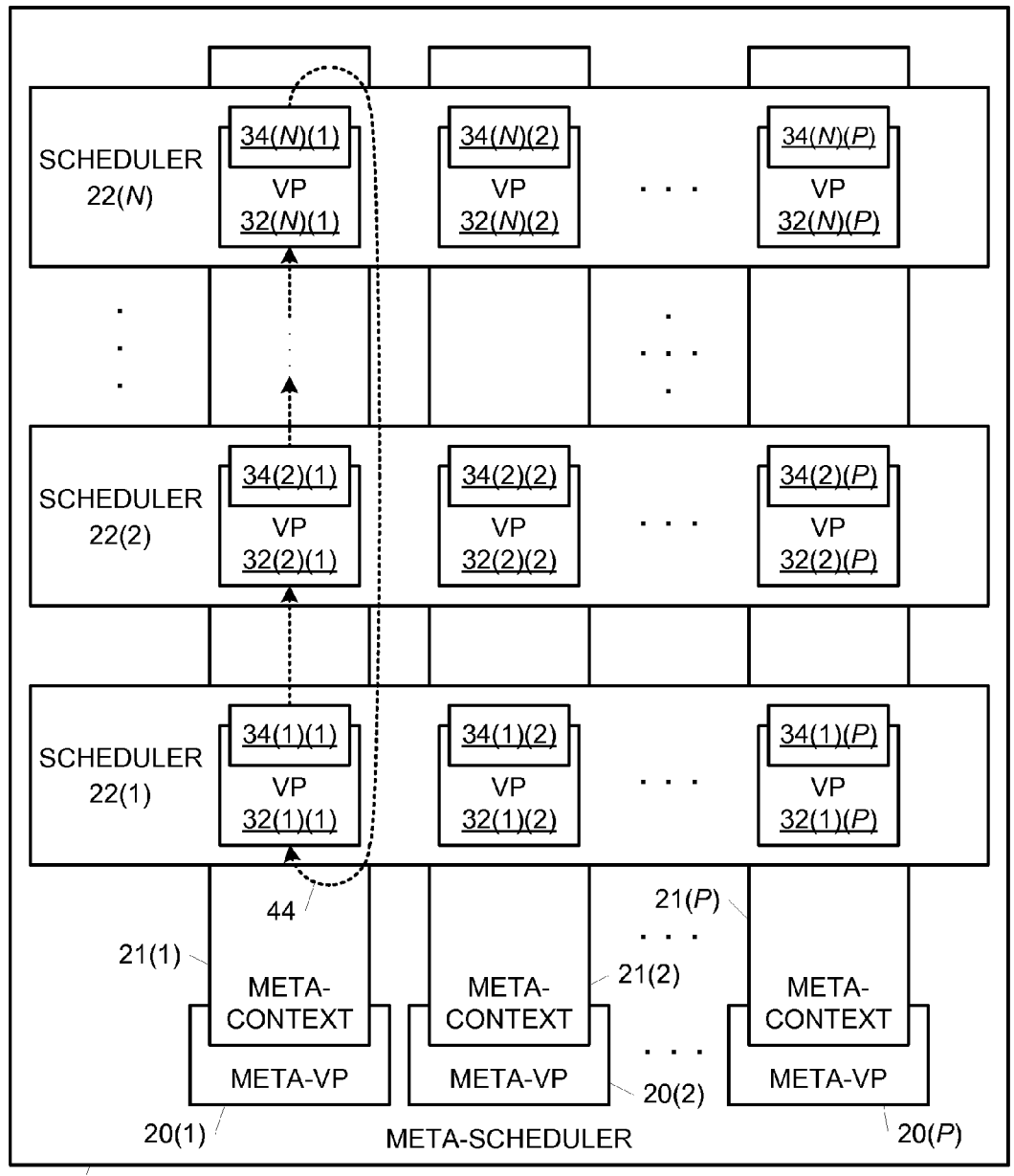

FIGS. 1A-1B are block diagrams illustrating embodiments of a meta-scheduler 18 with meta-virtual processors 20(1)-20(P) and corresponding meta-contexts 21(1)-21(P) (viz., thread proxies) in a runtime environment 10, where P is an integer that is greater than or equal to one and denotes the Pth meta-virtual processor 20(P) and meta-context 21(P). Each meta-context 21 provides quanta of execution of a corresponding meta-virtual processor 20 to scheduler-contexts 34 on corresponding virtual processors 32 across a set of schedulers 22(1)-22(N) of the meta-scheduler 18, where N is an integer that is greater than or equal to one and denotes the Nth scheduler 22(N).

In FIG. 1A, runtime environment 10 represents a runtime mode of operation in a computer system, such as a computer system 100 shown in FIG. 5 and described in additional detail below, where the computer system is executing instructions. The computer system generates runtime environment 10 from a runtime platform such as a runtime platform 122 shown in FIG. 5 and described in additional detail below.

Runtime environment 10 includes an least one invoked process 12, a resource management layer 14, and a set of hardware threads 16(1)-16(M), where M is an integer that is greater than or equal to one and denotes the Mth hardware thread 16(M). Runtime environment 10 allows tasks from process 12 to be executed, along with tasks from any other processes that co-exist with process 12 (not shown), using an operating system (OS) such as an OS 120 shown in FIG. 5 and described in additional detail below, resource management layer 14, and hardware threads 16(1)-16(M). Runtime environment 10 operates in conjunction with the OS and/or resource management layer 14 to allow process 12 to obtain processor and other resources of the computer system (e.g., hardware threads 16(1)-16(M)).

Runtime environment 10 includes a meta-scheduler function that generates meta-scheduler 18 with meta-virtual processors 20 and meta-contexts 21 and a scheduler function that generates schedulers 22 for inclusion in meta-scheduler 18. In one embodiment, the meta-scheduler and scheduler functions are implemented as application programming interfaces (APIs). In other embodiments, one or more of the functions may be implemented using other suitable programming constructs. When invoked, the meta-scheduler function creates meta-scheduler 18 to manage one or more schedulers 22 in meta-scheduler 18. The meta-scheduler function also creates a set of meta-virtual processors 20(1)-20(P), where each meta-virtual processor 20 manages a corresponding set of virtual processors 32 across the schedulers 22 in meta-scheduler 18. The meta-scheduler function further creates a set of meta-contexts 21(1)-21(P), where each meta-context 21 executes a corresponding set of scheduler-contexts across the schedulers 22 in meta-scheduler 18 on a corresponding meta-virtual processor 20. The scheduler function creates a scheduler 22 in meta-scheduler 18, where each scheduler 22 operates to schedule scheduler-contexts of process 12 for execution on virtual processors 32 of the scheduler 22. The scheduler-contexts execute on meta-contexts 21 which in turn execute on execution contexts on hardware threads 16. Runtime environment 10 may exploit fine grained concurrency that application or library developers express in their programs (e.g., process 12) using accompanying tools that are aware of the facilities that the meta-scheduler, meta-context, and scheduler functions provide.

Process 12 includes an allocation of processing and other resources that hosts execution contexts (e.g., threads, fibers, or child processes). Process 12 obtains access to the processing and other resources in the computer system (e.g., hardware threads 16(1)-16(M)) from the OS and/or resource management layer 14. Process 12 causes tasks to be executed using the processing and other resources.

Process 12 generates work in tasks of variable length where each task is associated with a scheduler-context in scheduler 22. Each task includes a sequence of instructions that perform a unit of work when executed by the computer system. Each scheduler-context includes program state and machine state information that is saved when the scheduler-context blocks, yields, or is otherwise interrupted. Scheduler-contexts may terminate or enter an idle or sleep state when there are no more tasks left to execute. For each task, runtime environment 10 and/or process 12 either assign the task to scheduler 22 to be scheduled for execution or otherwise cause the task to be executed without using scheduler 22.

Process 12 may be configured to operate in a computer system based on any suitable execution model, such as a stack model or an interpreter model, and may represent any suitable type of code, such as an application, a library function, or an operating system service. Process 12 has a program state and machine state associated with a set of allocated resources that include a defined memory address space. Process 12 executes autonomously or substantially autonomously from any co-existing processes in runtime environment 10. Accordingly, process 12 does not adversely alter the program state of co-existing processes or the machine state of any resources allocated to co-existing processes. Similarly, co-existing processes do not adversely alter the program state of process 12 or the machine state of any resources allocated to process 12.

Resource management layer 14 allocates processing resources to process 12 by assigning one or more hardware threads 16 to process 12. Resource management layer 14 also includes the meta-scheduler function in one embodiment and thus, creates and manages meta-scheduler 18, meta-virtual processors 20, and meta-contexts 21. Resource management layer 14 causes meta-contexts 21 on corresponding meta-virtual processors 20 to be executed on underlying execution contexts obtained from the OS on hardware threads 16. Resource management layer 14 exists separately from the OS in the embodiments of FIGS. 1A and 1B. In other embodiments, resource management layer 14 or some or all of the functions thereof may be included in the OS or runtime environment 10.

Hardware threads 16 reside in execution cores of a set or one or more processor packages (e.g., processor packages 102 shown in FIG. 5 and described in additional detail below) of the computer system. Each hardware thread 16 is configured to execute instructions independently or substantially independently from the other execution cores and includes a machine state. Hardware threads 16 may be included in a single processor package or may be distributed across multiple processor packages. Each processor package may include hardware threads 16 with the same or different architectures and/or instruction sets. For example, hardware threads 16 may include any suitable combination of in-order cores, superscalar cores, and general purpose graphical processing unit (GPGPU) cores. Each execution core in a processor package may include one or more hardware threads 16.

Process 12 implicitly or explicitly causes meta-scheduler 18, meta-virtual processors 20(1)-20(P), meta-contexts 21(1)-21(P), and schedulers 22(1)-22(N) to be created via the corresponding functions provided by runtime environment 10 and/or resource management layer 14. Meta-scheduler 18, meta-virtual processors 20, meta-contexts 21, and schedulers 22 may be implicitly created when process 12 uses APIs available in the computer system or programming language features. In response to the API or programming language features, runtime environment 10 creates meta-scheduler 18, meta-virtual processors 20, meta-contexts 21, and schedulers 22 that inherit the policies of meta-scheduler 18. To explicitly create meta-scheduler 18, meta-virtual processors 20, meta-contexts 21, and schedulers 22, process 12 may invoke the meta-scheduler and scheduler functions provided by runtime environment 10 and specify one or more policies for meta-scheduler 18, meta-virtual processors 20, meta-contexts 21, and schedulers 22.

Meta-scheduler 18 manages meta-virtual processors 20 and corresponding meta-contexts 21 to share meta-virtual processors 20 and meta-contexts 21 among all schedulers 22(1)-22(N) in meta-scheduler 18. Meta-scheduler 18 may share meta-virtual processors 20 and meta-contexts 21 among schedulers 22(1)-22(N) cooperatively, preemptively, or with another suitable type of time slicing. As part of creating meta-scheduler 18, resource management layer 14 allocates meta-virtual processors 20 and meta-contexts 21 to meta-scheduler 18 based on supply and demand and any policies of meta-scheduler 18. In one embodiment, meta-scheduler 18 creates each scheduler 22(1)-22(N). In other embodiments, one or more of scheduler 22(1)-22(N) that are external to meta-scheduler 18 may invoke a programming API or other suitable programming construct to attach to meta-scheduler 18.

In one embodiment, process 12 adds each scheduler 22(1)-22(N) to meta-scheduler 18 with the same set of scheduler policies. In another embodiment, process 12 adds each scheduler 22(1)-22(N) to meta-scheduler 18 with a different set of scheduler policies. Each scheduler 22 receives virtual processors 32(1)-32(P) where each virtual processor 32 forms an abstraction of underlying meta-virtual processors 20 and hardware threads 16. Each scheduler 22 also receives information that maps virtual processors 32(1)-32(P) of a scheduler 22 to corresponding meta-virtual processors 20(1)-20(P). As shown in FIG. 1B, virtual processors 32(1)(1)-32(N)(1) from respective schedulers 22(1)-22(N) map to meta-virtual processor 20(1), virtual processors 32(1)(2)-32(N)(2) from respective schedulers 22(1)-22(N) map to meta-virtual processor 20(2), and so on.

Meta-scheduler 18 allows meta-virtual processors 20 and meta-contexts 21 to be shared among scheduler-contexts 34 of schedulers 22(1)-22(N) cooperatively, preemptively, or with another suitable time slicing. Each meta-virtual processor 20 forms an abstraction of a hardware thread 16 and executes a corresponding meta-context 21. Each meta-context 21 forms an abstraction of a scheduler-context and executes the scheduler-context on a corresponding meta-virtual processor 20. Resource management layer 14 multiplexes meta-virtual processors 20 onto hardware threads 16 by mapping each meta-virtual processor 20 to a hardware thread 16. Resource management layer 14 may map more than one meta-virtual processor 20 onto a particular hardware thread 16 but maps only one hardware thread 16 to each meta-virtual processor 20. In other embodiments, resource management layer 14 manages processing resources in other suitable ways to cause meta-contexts 21 to be executed by hardware threads 16.

Meta-scheduler 18 schedules the scheduler-contexts on meta-contexts 21 and schedules meta-contexts 21 on meta-virtual processors 20 which execute on execution contexts associated with hardware threads 16. Each meta-context 21 switches between execution of scheduler-contexts 34 on virtual processors 32 on the corresponding meta-virtual processor 20. Each meta-context 21 causes a single scheduler-context 34 to be executed at any given time but periodically performs context switches between execution of scheduler-contexts 34 to execute each of the set of scheduler-contexts 34 on virtual processors 32 that correspond to the meta-virtual processor 20 of the meta-context 21. Each meta-context 21 provides a quantum of execution upon dispatching a scheduler-context 34 of a scheduler 22. The quantum of execution may be expressed in time (e.g., 50 ms), by a number of tasks to be executed, or by any other suitable metric. The quantum of execution may be the same or different for each dispatched scheduler-context 34.

As shown in FIG. 1B, meta-context 21(1) switches between execution of scheduler-contexts 34(1)(1)-34(N)(1) from respective schedulers 22(1)-22(N), meta-context 21(2) switches between execution of scheduler-contexts 34(1)(2)-34(N)(2) from respective schedulers 22(1)-22(N), and so on. As shown by an arrow 44, for example, meta-context 21(1) dispatches scheduler-context 34(1)(1) for a quantum of execution on meta-virtual processor 20(1) and, once scheduler-context 34(1)(1) detects that quantum has expired and yields back to meta-context 21(1), meta-context 21(1) dispatches scheduler-context 34(2)(1) for a quantum of execution on meta-virtual processor 20(1). Meta-context 21(1) continues the process of dispatching a next one of the set of scheduler-contexts 34(1)(1)-34(N)(1) each time a current one of the set of scheduler-context 34(1)(1)-34(N)(1) yields back to meta-context 21(1).

Referring back to FIG. 1A, scheduler 22 executes scheduler-contexts 34 on virtual processors 32 which are, in turn, executed by meta-contexts 21 on meta-virtual processors 20. The set of scheduler-contexts in each scheduler 22 includes a set of scheduler-contexts 34 with respective, associated tasks 36 that are being executed by virtual processors 32 and, at any point during the execution of process 12, a set of zero or more runnable scheduler-contexts 38 and a set of zero or more blocked (i.e., wait-dependent) scheduler-contexts 40. Each scheduler-context 34, 38, and 40 includes state information that indicates whether a scheduler-context 34, 38, or 40 is executing, runnable (e.g., in response to becoming unblocked or added to a scheduler 22), or blocked. Scheduler-contexts 34 that are executing have been attached to a virtual processor 32 and are currently executing. Scheduler-contexts 38 that are runnable include an associated task 39 and are ready to be executed by an available virtual processor 32. Scheduler-contexts 40 that are blocked also include an associated task 41 and are waiting for data, a message, or an event that is being generated by another scheduler-context 34 or will be generated by another scheduler-context 38 or 40.

Each scheduler-context 34 executing on a virtual processor 32 may generate, in the course of its execution, additional tasks 42, which are organized in any suitable way (e.g., added to work queues (not shown in FIGS. 1A and 1B)). Work may be created by using either application programming interfaces (APIs) provided by runtime environment 10 or programming language features and corresponding tools in one embodiment. When processing resources are available in a scheduler 22, tasks are assigned to scheduler-contexts 34 or 38 that execute them to completion on virtual processors 32 before picking up new tasks. A scheduler-context 34 executing on a virtual processor 32 may also unblock other scheduler-contexts 40 by generating data, a message, or an event that will be used by other scheduler-contexts 40.

Figure 4:
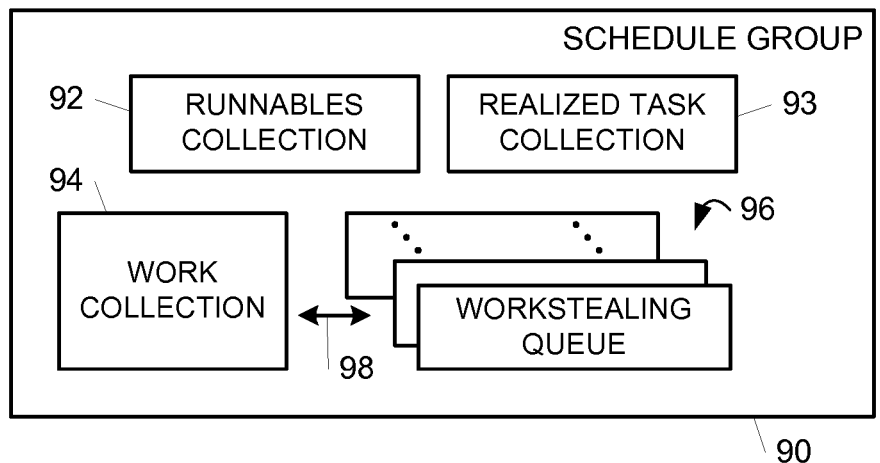
FIG. 4 is a block diagram illustrating an embodiment of a scheduling group for use in a scheduler of a meta-scheduler.

Each task in each scheduler 22 may be realized (e.g., realized tasks 36 and 39), which indicates that a scheduler-context 34 or 38 has been or will be attached to the task and the task is ready to execute. Realized tasks typically include light-weight tasks and agents and may be associated with a scheduler-context 34 or 38 just before executing or in advance of execution. A task that is not realized is termed unrealized. Unrealized tasks (e.g., tasks 42) may be created as child tasks generated by the execution of parent tasks and may be generated by parallel constructs (e.g., parallel or parallel for). Each scheduler 22 may be organized into a synchronized collection (e.g., a stack and/or a queue) for logically independent tasks with scheduler-contexts (i.e., realized tasks) along with a list of workstealing queues for dependent tasks (i.e., unrealized tasks) as illustrated in the embodiment of FIG. 4 described below.

Prior to executing tasks, scheduler 22 creates scheduler-contexts 34 and 38 for execution on meta-contexts 21. Available virtual processors 32 locate and execute scheduler-contexts 34 to begin executing tasks. Virtual processors 32 become available again in response to a scheduler-context 34 completing, blocking, or otherwise being interrupted (e.g., explicit yielding or forced preemption). When virtual processors 32 become available, the available virtual processor 32 may switch to a runnable scheduler-context 38 to execute an associated task 39. The available virtual processor 32 may also execute a next task 39 or 42 as a continuation on a current execution context 34 if the previous task 36 executed by the current execution context 34 completed.

Each scheduler 22 searches for a runnable execution context 38, a realized task 39, or an unrealized task 42 to attach to the available virtual processor 32 for execution in any suitable way. For example, a scheduler 22 may search for a runnable execution context 38 to execute before searching for a realized task 39 or an unrealized task 42 to execute. Each scheduler 22 continues attaching scheduler-contexts 38 to available virtual processors 32 for execution until all tasks and scheduler-contexts 38 of each scheduler 22 have been executed. In other embodiments, runnable execution contexts 38 and realized tasks 39 may be merged into single concept from the perspective of schedulers 22.

Figure 2A:
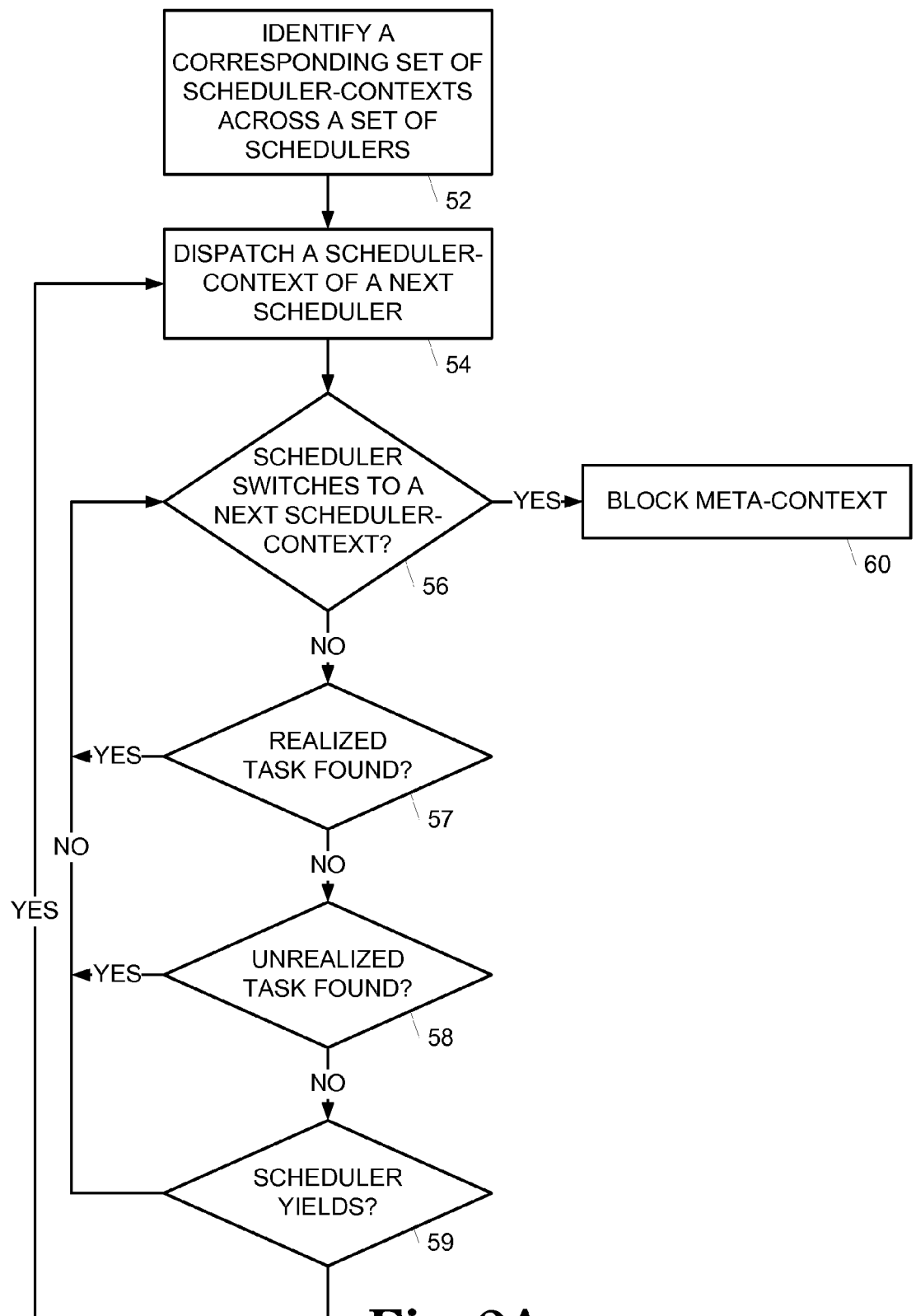
FIGS. 2A-2B are flow charts illustrating embodiments of methods for executing meta-contexts in a meta-scheduler.
Figure 2B:
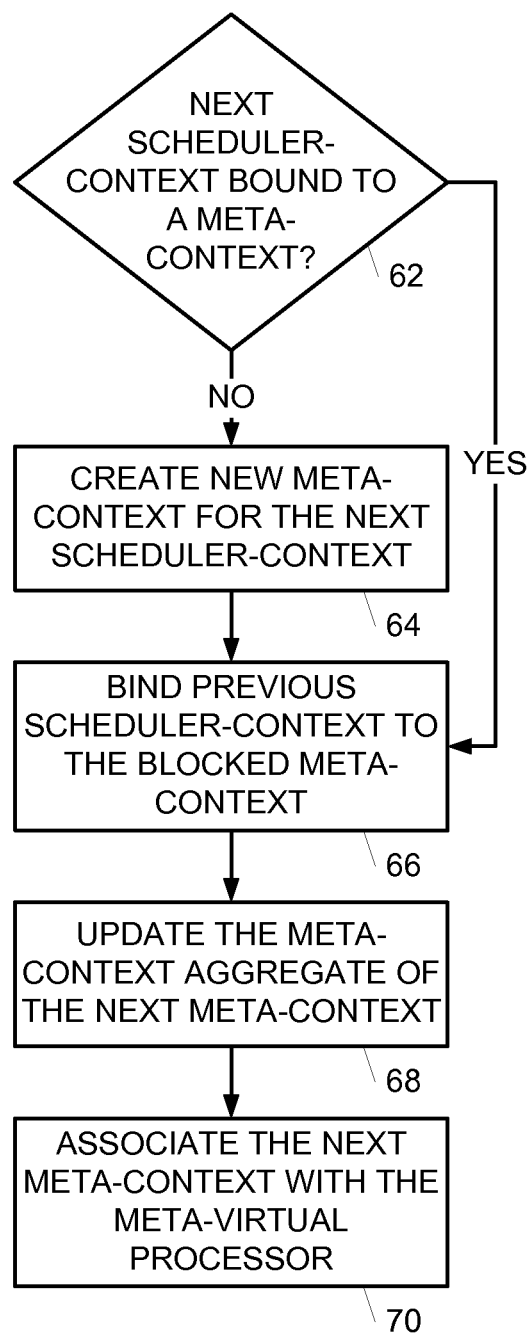

The operation of meta-scheduler 18, meta-virtual processors 20, meta-contexts 21, and schedulers 22 in executing process 12 will now be described with reference to FIGS. 2A-2B and 3A-3B. FIGS. 2A-2B are flow charts illustrating embodiments of methods for executing meta-contexts 21 in meta-scheduler 18, and FIGS. 3A-3D are block diagrams illustrating embodiments of meta-contexts 21(1) and 21(2) in meta-scheduler 18 during the execution of process 12.

Figure 3A:
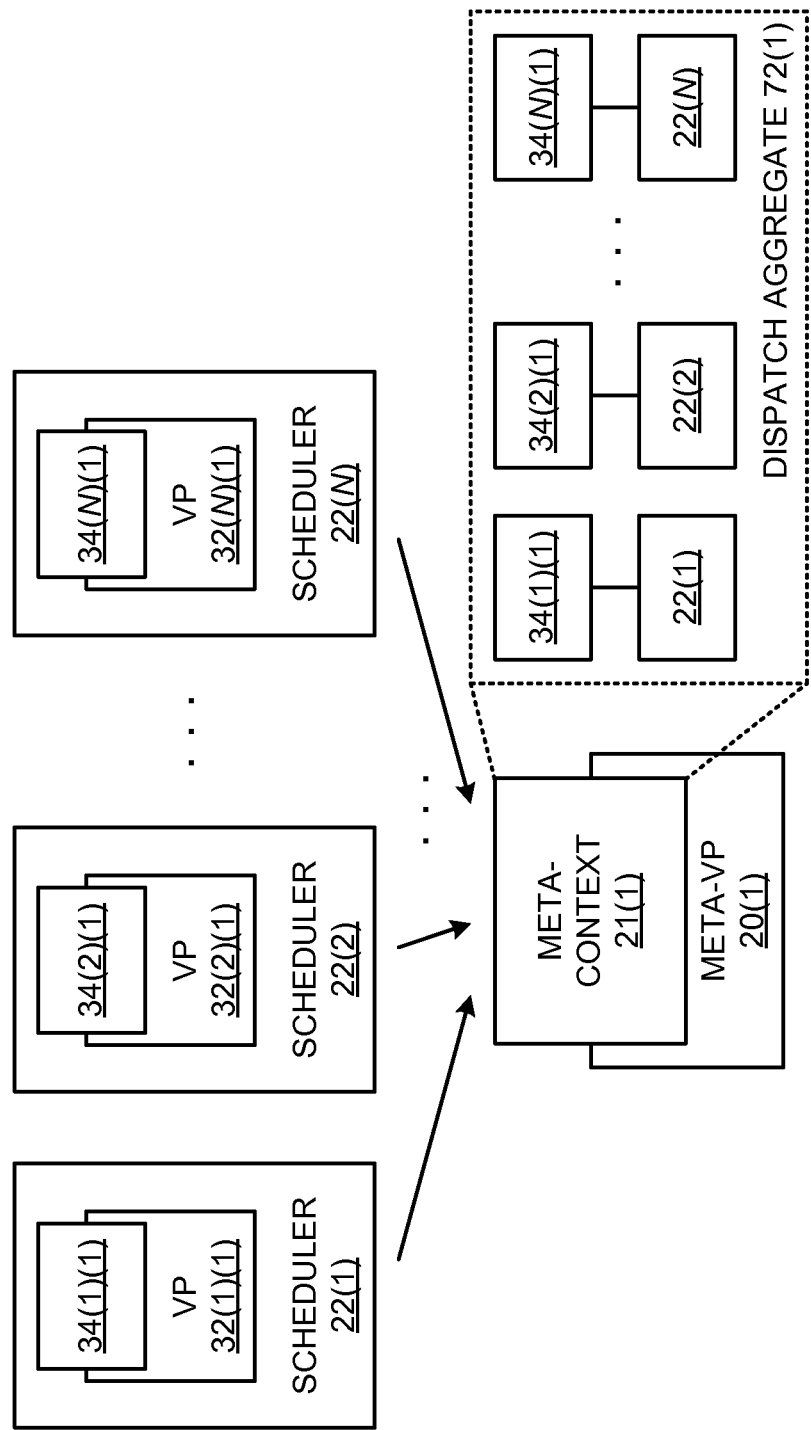

In FIG. 2A, each meta-context 21 identifies a corresponding set of scheduler-contexts 34 across a set of schedulers 22(1)-22(N) as indicated in a block 52. Each meta-context 21 in meta-scheduler 18 maintains a dispatch aggregate 72 (e.g., dispatch aggregate 72(1) shown in FIG. 3A). Each dispatch aggregate 72 is a data structure that identifies the scheduler-contexts 34 attached to the virtual processors 32 corresponding to the meta-virtual processor 20 of the meta-context 21. As shown in the example of FIG. 3A, dispatch aggregate 72(1) of meta-context 21(1) identifies scheduler-contexts 34(1)(1)-34(N)(1) attached to virtual processors 32(1)(1)-32(N)(1) that correspond to meta-virtual processor 20(1).

Scheduler 22 adds virtual processors 32 to one or more meta-virtual processors 20 when a scheduler 22 is added to meta-scheduler 18 and removes virtual processors 32 from one or more meta-virtual processors 20 when a scheduler 22 is removed from meta-scheduler 18. In addition, schedulers 22 may also remove virtual processors 32 from one or more meta-virtual processors 20 when virtual processors 32 enter an idle or sleep state and add virtual processors 32 to one or more meta-virtual processors 20 when virtual processors 32 return from an idle or sleep state.

For each meta-virtual processor 20 with an added virtual processor 32, a corresponding meta-context 21 modifies a corresponding dispatch aggregate 72 to identify a scheduler-context 34 attached to the virtual processor 32 added to the meta-virtual processor 20. For each meta-virtual processor 20 with a removed virtual processor 32, a corresponding meta-context 21 modifies a corresponding dispatch aggregate 72 to remove the identification of the scheduler-context 34 attached to the virtual processor 32 removed from the meta-virtual processor 20. When a virtual processor 32 enters an idle or sleep state in a scheduler 22, the scheduler 22 notifies the corresponding meta-virtual processor 20 and meta-context 21. Because the virtual processor 32 is removed from the corresponding dispatch aggregate 72, meta-context 21 does not provide the virtual processor 32 with a quantum of execution until notified that the virtual processor 32 is awake and has tasks to execute.

Meta-contexts 21 use dispatch aggregates 72 to identify scheduler-contexts 34 to dispatch for execution. In one embodiment, each meta-context 21 switches between scheduler-contexts 34 of schedulers 22 in a corresponding dispatch aggregate 72 in a round robin order. In other embodiments, each meta-context 21 switches between scheduler-contexts 34 of schedulers 22 in a corresponding dispatch aggregate 72 in other suitable orders.

Figure 3B:
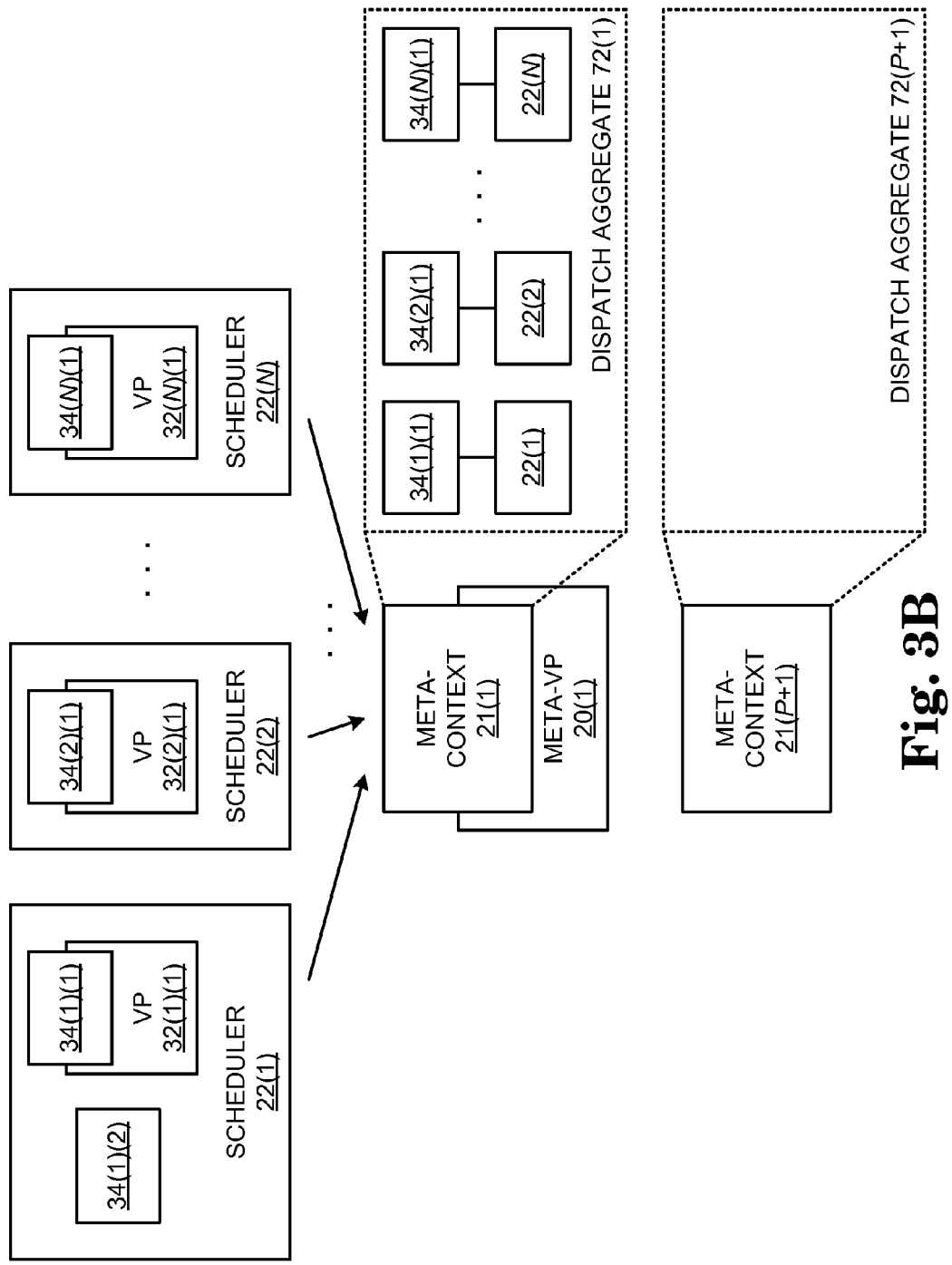

Each meta-context 21 dispatches a scheduler-context 34 of next scheduler 22 as determined from a corresponding dispatch aggregate 72 as indicated in a block 54. In the example of FIG. 3B, meta-context 21(1) may dispatch a scheduler-context 34(1)(1) of next scheduler 22(1).

Each meta-context 21 provides a quantum of execution upon dispatching a scheduler-context 34 of a scheduler 22. Each scheduler 22 that receives a quantum of execution causes a scheduler-context 34 to be executed on the corresponding virtual processor 32 via the corresponding meta-context 21 and corresponding meta-virtual processor 20 for the allotted quantum.

Each scheduler 22 detects when a quantum has expired and prevents the corresponding scheduler-context 34 from scheduling another task for execution. Each scheduler 22 also notifies the corresponding meta-context 21 when a quantum has expired to return execution to meta-context 21 (e.g., by the scheduler-context 34 function exiting and returning control to meta-context 21). In one embodiment, each scheduler 22 may determine if a quantum has expired each time that a task completes, blocks, or is otherwise interrupted on a corresponding scheduler-context 34. If so, then scheduler 22 returns control of execution to meta-context 21. If not, then scheduler 22 allows scheduler-context 34 to schedule another task for execution. In other embodiments, each scheduler 22 and/or scheduler-context 34 may determine if a quantum has expired in other suitable ways.

During each quantum allotted to a scheduler 22 (i.e., during execution of a scheduler-context 34 by the scheduler 22), the meta-context 21 detects when a scheduler 22 switches to a next scheduler-context 34 on the corresponding virtual processor 32 as indicated in a block 56 and when the scheduler yields as indicated in a block 59. Scheduler 22 notifies the meta-context 21 when a switch to a next scheduler-context 34 is desired and when scheduler 22 yields (i.e., the quantum has expired).

If scheduler 22 does not switch to a next scheduler-context 34 on the corresponding virtual processor 32, then scheduler 22 executes a realized task 39, if found, on the current scheduler-context 34 as indicated in a block 57 or an unrealized task 42 on the current scheduler-context 34 if a realized task 39 is not found and the unrealized task 42 is found as indicated in a block 58. If neither a realized task 39 or an unrealized task 42 is found, then scheduler 22 may pause before again searching for another task or scheduler-context 38 to execute as indicated in blocks 56, 57, and 58 or yield as indicated in block 59.

When a scheduler 22 yields without switching to a next scheduler-context 34, the meta-context 21 identifies a scheduler-context 34 of a next scheduler 22 using the dispatch aggregate 72 and dispatches the identified scheduler-context 34 as indicated in a block 54. In the example of FIG. 3A, meta-context 21 may identify a scheduler-context 34(2)(1) of a next scheduler 22(2) using the dispatch aggregate 72(1) and dispatch scheduler-context 34(2)(1) with a quantum to scheduler 22(2).

During execution of a scheduler-context 34 by the scheduler 22, scheduler 22 may desire to switch to a next scheduler-context 34 or 38 on the virtual processor 32. The scheduler-context 34 on virtual processor 32 may block, complete, or otherwise be interrupted, for example, to prompt scheduler 22 to desire to make the context switch. If a scheduler 22 notifies meta-context 21 that a switch to a next scheduler-context 34 or 38 (i.e., a scheduler-context 34 or 38 that differs from the scheduler-context 34 dispatched by meta-context 21) is desired, then meta-context 21 blocks as indicated in a block 60.

Any time that a meta-context 21 blocks, the corresponding meta-virtual processor 20 switches to another meta-context 21 as illustrated in FIG. 2B. In response to detecting that a meta-context 21 blocks, runtime environment 10 determines whether the next scheduler-context 34 or 38 in the scheduler 22 performing the context switch is already bound to a meta-context 21 as indicated in a block 62.

If the next scheduler-context 34 or 38 is not bound to a meta-context 21, then runtime environment 10 creates a new meta-context 21 for the next scheduler-context 34 as indicated in a block 64. Otherwise, the meta-context 21 which is already bound to the next scheduler-context 34 will be used. In both cases, runtime environment 10 binds the previous scheduler-context 34 (i.e., the scheduler-context 34 being switched out by the scheduler 22) to the blocked meta-context 21 as indicated in a block 64. Runtime environment 10 updates the dispatch aggregate 72 of the next meta-context 21 as indicated in a block 68. To do so, runtime environment 10 moves all of the dispatch aggregate 72 of the blocked meta-context 21 except the previous scheduler-context 34 into the dispatch aggregate 72 of the next meta-context 21. Runtime environment 10 then adds the next scheduler-context 34 or 38 and scheduler 22 into the dispatch aggregate 72 of the next meta-context 21. Runtime environment 10 associates the next meta-context 21 with the corresponding meta-virtual processor 20 as indicated in a block 70.

FIGS. 3B-3C illustrate an example of the blocking of meta-context 21(1) and the switch to a next meta-context 21(P+1) on meta-virtual processor 20(1). In FIG. 3B, scheduler 22(1)

notifies meta-context 21(1) of a context switch to scheduler-context 34(1)(2). Because scheduler-context 34(1)(2) was not already bound to a meta-context 21, runtime environment 10 creates a new meta-context 21(P+1) for scheduler-context 34(1)(2). In FIG. 3C, runtime environment 10 binds scheduler-context 34(1)(1) to the blocked meta-context 21(1). Runtime environment 10 updates dispatch aggregate 72(P+1) by moving all of the dispatch aggregate 72(1) except scheduler-context 34(1)(1) into dispatch aggregate 72(P+1) and adding scheduler-context 34(1)(2) and scheduler 22(1) into dispatch aggregate 72(P+1). Runtime environment 10 associates meta-context 21(P+1) with meta-virtual processor 20(1) and blocks meta-context 21(1).

Figure 3D:
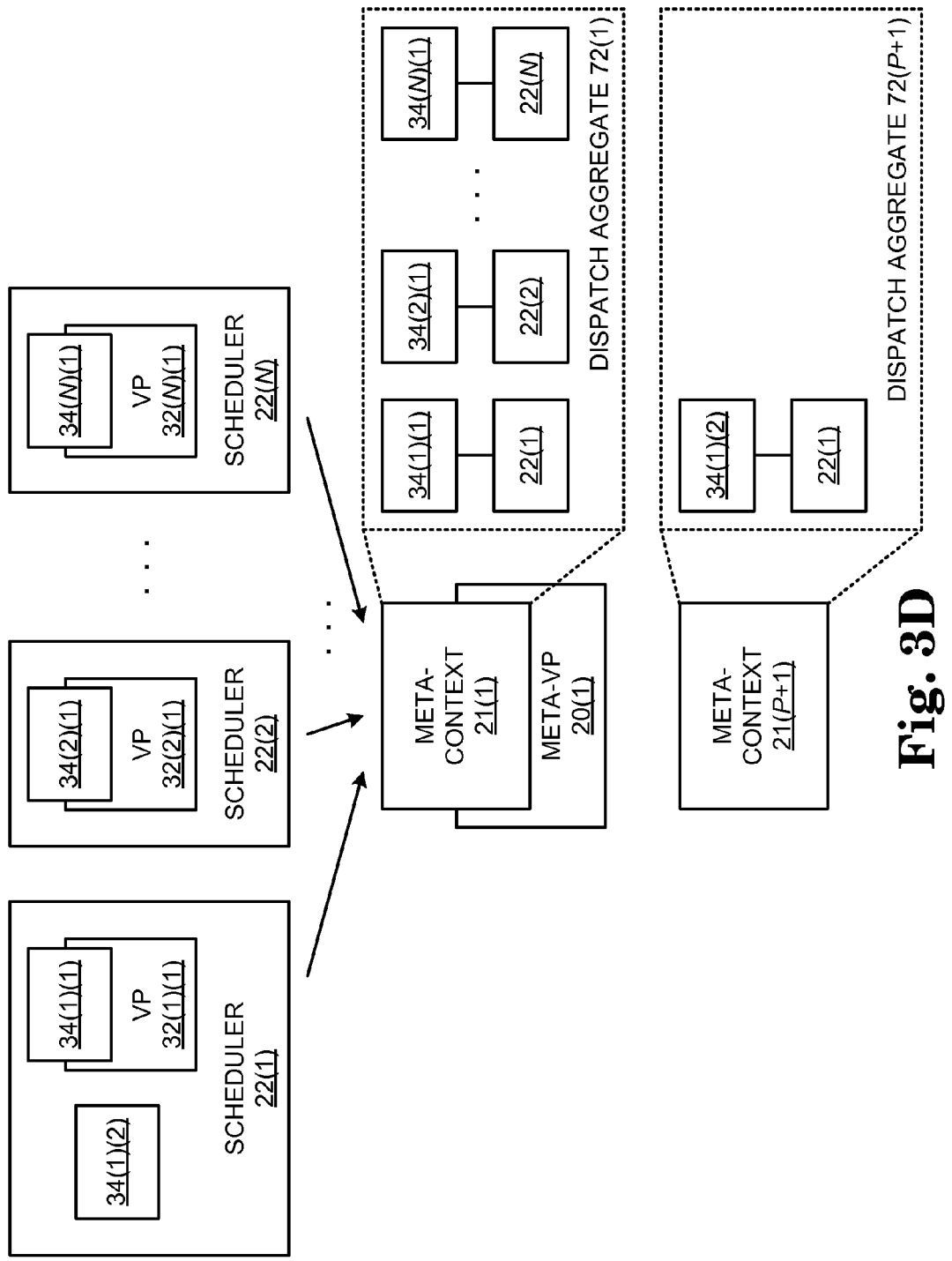

At some later point, scheduler 22(1) may decide to switch back to scheduler-context 32(1)(1) on virtual processor 32(1). FIG. 3D illustrates an example of the resumption of meta-context 21(1) and the blocking of meta-context 21(P+1) on meta-virtual processor 20(1). In FIG. 3D, scheduler 22(1) notifies meta-context 21(P+1) of a context switch to scheduler-context 34(1)(1). Runtime environment 10 binds scheduler-context 34(1)(2) to the blocked meta-context 21(P+1) and blocks meta-context 21(P+1). Because scheduler-context 34(1)(1) is already bound to meta-context 21(1), runtime environment 10 updates dispatch aggregate 72(1) by moving all of the dispatch aggregate 72(P+1) except scheduler-context 34(1)(2) into dispatch aggregate 72(P+1) to join scheduler-context 34(1)(1) and scheduler 22(1). Runtime environment 10 re-associates meta-context 21(1) with meta-virtual processor 20(1).

In the above embodiments, each meta-context 21 executes to process information received from schedulers 22 between dispatches of scheduler-contexts 34. Accordingly, each meta-context 21 maintains its own state to prevent races between schedulers 22.

Although each scheduler 22 is shown as including P virtual processors 32, one or more of schedulers 22 may include fewer than or greater than P virtual processors 32 in other embodiments. As a result, each meta-virtual processor 20 may have different numbers of corresponding virtual processors 32 at various times. In addition, each meta-virtual processor 20 may have different numbers of corresponding virtual processors 32 at various times in response to virtual processors 32 in schedulers 22 entering into and resuming from idle and sleep states.

As described above, each dispatch aggregate 72 includes only those scheduler-contexts 34 presently attached to a virtual processor 32 that corresponds to a meta-virtual processor 20. Accordingly, a dispatch aggregate 72 may, at various times, identify a single scheduler-context 34. When this occurs, a meta-context 21 may provide an extended or infinite quantum of execution to the corresponding scheduler 22 to allow the scheduler 22 to execute the scheduler-context 34 for an extended period without cooperatively yielding to the meta-context 21.

The above embodiments allow a desired number of meta-contexts 21 and corresponding execution contexts (e.g., OS threads) to service a large number of schedulers 22. By managing the number of meta-contexts 21, runtime environment 10 may prevent an excessive number of execution contexts from being created in process 12 and prevent the number of contexts from adversely impacting the execution of process 12.

In one embodiment, process 12 (shown in FIG. 1A) organizes tasks into one or more schedule groups 90 (shown in FIG. 4) and presents each schedule group 90 to one of schedulers 22(1)-22(N) as shown in FIG. 4. In other embodiments, process 12 organizes tasks into collections for each virtual processor 32 of each scheduler 22 or in other suitable ways.

FIG. 4 is a block diagram illustrating an embodiment of a schedule group 90 for use in a corresponding scheduler 22. Schedule group 90 includes a runnables collection 92, a realized task collection 93, a work collection 94, and a set of zero or more workstealing queues 96. Runnables collection 92 contains a list of unblocked scheduler-contexts 38. A scheduler 22 adds a scheduler-context 38 to runnables collection 92 when a scheduler-context 40 becomes unblocked. Realized task collection 93 contains a list of realized tasks 39 (e.g., unstarted agents) that may or may not have associated scheduler-contexts 38. The scheduler 22 adds a realized task to realized task collection 93 when a new runnable task is presented to scheduler 22 by process 12. Work collection 94 contains a list of workstealing queues 96 as indicated by an arrow 98 and tracks the scheduler-contexts 34 that are executing tasks from the workstealing queues 96. Each workstealing queue 96 includes one or more unrealized tasks 42 with no assigned scheduler-context.

Using the embodiment of FIG. 4, the scheduler 22 may first search for unblocked scheduler-contexts 38 in the runnables collection 92 of each schedule group 90 in the scheduler 22. The scheduler 22 may then search for realized tasks in the realized task collection 93 of all schedule groups 90 in the scheduler 22 before searching for unrealized tasks in the workstealing queues 96 of the schedule groups 90.

In one embodiment, a virtual processor 32 that becomes available may attempt to locate a runnable scheduler-context 38 in the runnables collection 92 in the schedule group 90 from which the available virtual processor 32 most recently obtained a runnable scheduler-context 38 (i.e., the current schedule group 90). The available virtual processor 32 may then attempt to locate a runnable scheduler-context 38 in the runnables collections 92 in the remaining schedule groups 90 of the scheduler 22 in a round-robin or other suitable order. If no runnable scheduler-context 38 is found, then the available virtual processor 32 may then attempt to locate an unrealized task 42 in the workstealing queues 96 of the current schedule group 90 before searching the workstealing queues 96 in the remaining schedule groups 90 of the scheduler 22 in a round-robin or other suitable order.

In other embodiments, schedule groups 90 contain other suitable numbers, types, and/or configurations of task collections.

Figure 5:
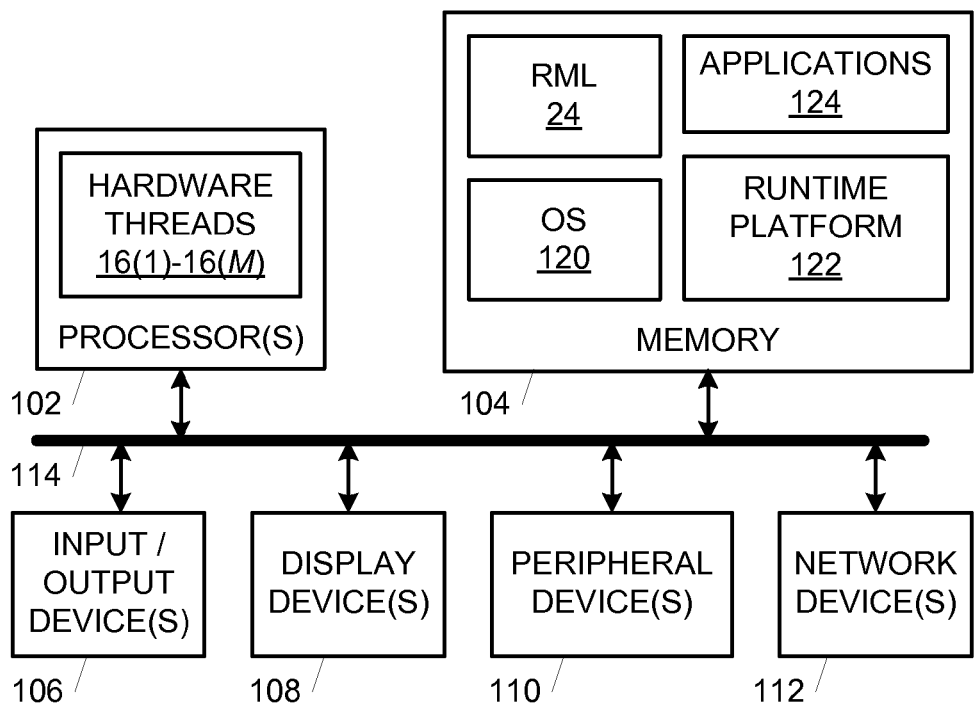
FIG. 5 is a block diagram illustrating an embodiment of a computer system configured to implement a runtime environment including a meta-scheduler with meta-virtual processors and meta-contexts.

FIG. 5 is a block diagram illustrating an embodiment of computer system 100 which is configured to implement runtime environment 10 including meta-scheduler 18 with meta-virtual processors 20 and meta-contexts 21.

Computer system 100 includes one or more processor packages 102, a memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 include hardware threads 16(1)-16(M). Each processor package 102 may include hardware threads 16 with the same or different architectures and/or instruction sets. For example, hardware threads 16 may include any combination of in-order execution cores, superscalar execution cores, and GPGPU execution cores. Each hardware thread 16 in processor packages 102 is configured to access and execute instructions stored in memory system 104. The instructions may include a basic input output system (BIOS) or firmware (not shown), OS 120, a runtime platform 122, applications 124, and resource management layer 14 (also shown in FIG. 1A). Each hardware thread 16 may execute the instructions in conjunction with or in response to information received from input/output devices 106, display devices 108, peripheral devices 110, and/or network devices 112.

Computer system 100 boots and executes OS 120. OS 120 includes instructions executable by hardware threads 16 to manage the components of computer system 100 and provide a set of functions that allow applications 124 to access and use the components. In one embodiment, OS 120 is the Windows operating system. In other embodiments, OS 120 is another operating system suitable for use with computer system 100.

Resource management layer 14 includes instructions that are executable in conjunction with OS 120 to allocate resources of computer system 100 including hardware threads 16 as described above with reference to FIG. 1A. Resource management layer 14 may be included in computer system 100 as a library of functions available to one or more applications 124 or as an integrated part of OS 120.

Runtime platform 122 includes instructions that are executable in conjunction with OS 120 and resource management layer 14 to generate runtime environment 10 and provide runtime functions to applications 124. These runtime functions include a meta-scheduler function and a scheduler function as described in additional detail above with reference to FIGS. 1A and 1B. The runtime functions may be included in computer system 100 as part of an application 124, as a library of functions available to one or more applications 124, or as an integrated part of OS 120 and/or resource management layer 14.

Each application 124 includes instructions that are executable in conjunction with OS 120, resource management layer 14, and/or runtime platform 122 to cause desired operations to be performed by computer system 100. Each application 124 represents one or more processes, such as process 12 as described above, that may execute with meta-scheduler 18 as provided by runtime platform 122.

Memory system 104 includes any suitable type, number, and configuration of volatile or non-volatile storage devices configured to store instructions and data. Memory system 104 may include any suitable cache hierarchy, be configured as a shared or distributed memory system, and may embody a locality scheme such as a non-uniform memory access (NUMA) scheme. In addition, memory system 104 may be configured as a single instruction stream multiple different memory store (SIMD) system, a multiple instruction stream multiple different memory store (MIMD) system, or a computer cluster coupled through a messaging protocol such as concurrent read, concurrent write (CRCW), concurrent read, exclusive write (CREW), or parallel random access machine (PRAM).

The storage devices of memory system 104 represent computer readable storage media that store computer-executable instructions including OS 120, resource management layer 14, runtime platform 122, and applications 124. The instructions are executable by computer system to perform the functions and methods of OS 120, resource management layer 14, runtime platform 122, and applications 124 described herein. Examples of storage devices in memory system 104 include hard disk drives, random access memory (RAM), read only memory (ROM), flash memory drives and cards, and magnetic and optical disks.

Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method comprising:
providing a first quantum of execution on a first meta-virtual processor to a first scheduler-context of a first scheduler in a meta-scheduler created by a process executing on a computer system; and
providing a second quantum of execution on the first meta-virtual processor to a second scheduler-context of a second scheduler in the meta-scheduler subsequent to the first quantum of execution on the first meta-virtual processor, the first and second quantum being expressed in terms of a number of tasks to be executed, the first scheduler including a first plurality of virtual processors, the second scheduler including a second plurality of virtual processors, the first scheduler excluding the second plurality of virtual processors, the second scheduler excluding the first plurality of virtual processors, the first meta-virtual processor being one of a plurality of meta-virtual processors, the plurality of meta-virtual processors, the first plurality of virtual processors, and the second plurality of virtual processors having a same cardinality.

2. The method of claim 1 wherein the first scheduler-context is attached to a first virtual processor of the first scheduler, and wherein the second scheduler-context is attached to a second virtual processor of the second scheduler.

3. The method of claim 1 further comprising:
identifying the first scheduler-context and the first scheduler in a dispatch aggregate prior to providing the first quantum of execution; and
identifying the second scheduler-context and the second scheduler in the dispatch aggregate prior to providing the second quantum of execution, the second quantum of execution being extended to allow the second scheduler to execute the second scheduler-context without cooperatively yielding to a meta-context.

4. The method of claim 1 further comprising:
providing a third quantum of execution on a second meta-virtual processor to a third scheduler-context of the first scheduler during the first quantum of execution; and
providing a fourth quantum of execution on the second meta-virtual processor to a fourth scheduler-context of the second scheduler subsequent to the first quantum of execution on the second meta-virtual processor.

5. The method of claim 4 wherein the first scheduler-context is attached to a first virtual processor of the first scheduler, wherein the third scheduler-context is attached to a second virtual processor of the first scheduler, wherein the second scheduler-context is attached to a third virtual processor of the second scheduler, and wherein the fourth scheduler-context is attached to a fourth virtual processor of the second scheduler.

6. The method of claim 1 further comprising:
detecting that a third scheduler is added to the meta-scheduler; and
adding a third scheduler-context and the third scheduler to a dispatch aggregate corresponding to the first meta-virtual processor.

7. The method of claim 6 further comprising:
providing a third quantum of execution on the first meta-virtual processor to the third scheduler-context of the third scheduler in the meta-scheduler subsequent to the second quantum of execution on the first meta-virtual processor.

8. The method of claim 1 further comprising:
subsequent to providing the first quantum of execution, detecting that a virtual processor that executes the first scheduler-context has entered an idle state; and
subsequent to providing the second quantum of execution, providing a third quantum of execution on the first meta-virtual processor to the second scheduler-context of the second scheduler in the meta-scheduler prior to providing a fourth quantum of execution on the first meta-virtual processor to the first scheduler subsequent to the first scheduler-context returning from the idle state.

9. A method performed by a process executing on a computer system, the method comprising:
creating a meta-scheduler with first and second meta-virtual processors and corresponding first and second virtual processor contexts;
creating a first scheduler with first and second virtual processors in the meta-scheduler and a second scheduler with third and fourth virtual processors in the meta-scheduler, the first scheduler including a first plurality of virtual processors, the first and second virtual processors being part of the first plurality of virtual processors, the second scheduler including a second plurality of virtual processors, the third and fourth virtual processors being part of the second plurality of virtual processors, the first scheduler excluding the second plurality of virtual processors, the second scheduler excluding the first plurality of virtual processors, the first and second meta-virtual processor being part of a plurality of meta-virtual processors, the plurality of meta-virtual processors, the first plurality of virtual processors, and the second plurality of virtual processors having a same cardinality, the first and second schedulers having different sets of scheduler policies;
providing at least one quantum of execution to the meta-scheduler, the at least one quantum of execution expressed in terms of a number of tasks to be executed; and
associating the first and the third virtual processors with the first meta-virtual processor and the second and the fourth virtual processors with the second meta-virtual processor.

10. The method of claim 9 further comprising:
executing a first scheduler-context on the first virtual processor in response to receiving a first quantum of execution from the first meta-context; and
subsequent to the first quantum of execution, executing a second scheduler-context on the third virtual processor in response to receiving a second quantum of execution from the first meta-context.

11. The method of claim 10 further comprising:
yielding to the first meta-context in response to the first quantum of execution expiring; and
receiving the second quantum of execution subsequent to yielding to the first meta-context.

12. The method of claim 10 further comprising:
during the first quantum of execution, executing a third scheduler-context on the second virtual processor in response to receiving a third quantum of execution from the second meta-context; and
subsequent the third quantum of execution, executing a fourth scheduler-context on the fourth virtual processor in response to receiving a fourth quantum of execution from the second meta-context.

13. The method of claim 12 further comprising:
yielding to the second meta-context in response to the third quantum of execution expiring; and
receiving the fourth quantum of execution subsequent to yielding to the second meta-context.

14. The method of claim 9 further comprising:
executing a first scheduler-context on the first virtual processor in response to receiving a first quantum of execution from the first meta-context;
notifying the first meta-context of a context switch from the first scheduler-context to a second scheduler-context on the first virtual processor; and
executing the second scheduler-context on the first virtual processor in response to receiving a second quantum of execution from a third meta-context.

15. The method of claim 14 further comprising:
during the first quantum of execution, executing a third scheduler-context on the second virtual processor in response to receiving a third quantum of execution from the second meta-context.

16. A computer readable storage medium comprising:
a memory storing computer-executable instructions that, when executed by a computer system, perform a method comprising:

executing a first meta-context on a first meta-virtual processor in a meta-scheduler that switches between execution of at least a first scheduler-context on a first virtual processor of a first scheduler and a second scheduler-context on a second virtual processor of a second scheduler, the first scheduler including a first plurality of virtual processors, the first virtual processor being one of the first plurality of virtual processors, the second scheduler including a second plurality of virtual processors, the second virtual processor being one of the second plurality of virtual processors, the first scheduler excluding the second plurality of virtual processors, the second scheduler excluding the first plurality of virtual processors, the first meta-virtual processor including at most one virtual processor's associated tasks at one time, the first meta-context providing a quantum of execution expressed in terms of a number of tasks to be executed; and executing a second meta-context on a second meta-virtual processor in the meta-scheduler that switches between execution of at least a third scheduler-context on a third virtual processor of the first scheduler and a fourth scheduler-context on a fourth virtual processor of the second scheduler, the first meta-virtual processor and the second meta-virtual processor being part of a plurality of meta-virtual processors, the plurality of meta-virtual processors, the first plurality of virtual processors, and the second plurality of virtual processors having a same cardinality, both the third and fourth scheduler-contexts being capable of unblocking other scheduler-contexts, the second meta-context providing a quantum of execution expressed in terms of a number of tasks to be executed.

17. An apparatus comprising:
at least one processor arranged to perform steps comprising:
executing a first meta-context on a first meta-virtual processor in a meta-scheduler that switches between execution of at least a first scheduler-context on a first virtual processor of a first scheduler and a second scheduler-context on a second virtual processor of a second scheduler, the first scheduler including a first plurality of virtual processors, the first virtual processor being one of the first plurality of virtual processors, the second scheduler including a second plurality of virtual processors, the second virtual processor being one of the second plurality of virtual processors, the first scheduler excluding the second plurality of virtual processors, the second scheduler excluding the first plurality of virtual processors, the first meta-virtual processor including at most one virtual processor's associated tasks at one time, the first meta-context providing a quantum of execution expressed in terms of a number of tasks to be executed; and executing a second meta-context on a second meta-virtual processor in the meta-scheduler that switches between execution of at least a third scheduler-context on a third virtual processor of the first scheduler and a fourth scheduler-context on a fourth virtual processor of the second scheduler, the first meta-virtual processor and the second meta-virtual processor being part of a plurality of meta-virtual processors, the plurality of meta-virtual processors, the first plurality of virtual processors, and the second plurality of virtual processors having a same cardinality, both the third and fourth scheduler-contexts being capable of unblocking other scheduler-contexts, the second meta-context providing a quantum of execution expressed in terms of a number of tasks to be executed.

18. The apparatus of claim 17, the processor further arranged to perform steps comprising:
executing a third meta-context on the first meta-virtual processor in the meta-scheduler that switches between execution of at least a fifth scheduler-context on the first virtual processor of the first scheduler and the second scheduler-context on the second virtual processor of the second scheduler in response to the first scheduler switching to the fifth scheduler-context on the first virtual processor.

19. The apparatus of claim 18, the processor further arranged to perform steps comprising:
binding the first scheduler-context on the first virtual processor to the first meta-context in response to the first scheduler switching to the fifth scheduler-context on the first virtual processor; and
blocking the first meta-context.

20. The apparatus of claim 18, the processor further arranged to perform steps comprising:
creating the third meta-context in response to the fifth scheduler-context not being bound to the third meta-context.

* * * * *